United States Patent
Malmberg et al.

[11] Patent Number: 6,148,618
[45] Date of Patent: Nov. 21, 2000

[54] METHOD AND APPARATUS FOR SURFACE FREEZING

[75] Inventors: Jonny Malmberg, Helsingborg; Lennart Olsson, Nyhamnsläge, both of Sweden

[73] Assignee: Frigoscandia Equipment AB, Helsingborg, Sweden

[21] Appl. No.: 09/422,966

[22] Filed: Oct. 22, 1999

Related U.S. Application Data

[63] Continuation of application No. PCT/SE98/00735, Apr. 24, 1998.

[30] Foreign Application Priority Data

Apr. 25, 1997 [SE] Sweden ................................. 9701550

[51] Int. Cl.[7] ........................................................ F25D 13/06
[52] U.S. Cl. .................................... 62/63; 62/374; 62/380
[58] Field of Search ................................ 62/63, 374, 380

[56] References Cited

U.S. PATENT DOCUMENTS

| 2,324,517 | 7/1943 | King .......................................... 62/380 |
| 5,543,167 | 8/1996 | Onodera . |
| 5,551,251 | 9/1996 | Ochs et al. . |

FOREIGN PATENT DOCUMENTS

| 1 595 552 | 8/1981 | United Kingdom . |
| 2 141 813 | 1/1985 | United Kingdom . |

*Primary Examiner*—Ronald Capossela
*Attorney, Agent, or Firm*—Browdy and Neimark

[57] ABSTRACT

A method and apparatus for freezing a surface layer of food product (6), placed on a non-foraminous conveyor belt (7) wherein cold air in the form of jets is blown towards the underside of the non-foraminous conveyor belt. The apparatus for carrying out the method comprises, in addition to the non-foraminous conveyor belt (7), a plurality of stationary nozzles (14) for producing jets towards the underside of the non-foraminous conveyor belt in an area which extends over the width of the non-foraminous conveyor belt.

20 Claims, 1 Drawing Sheet

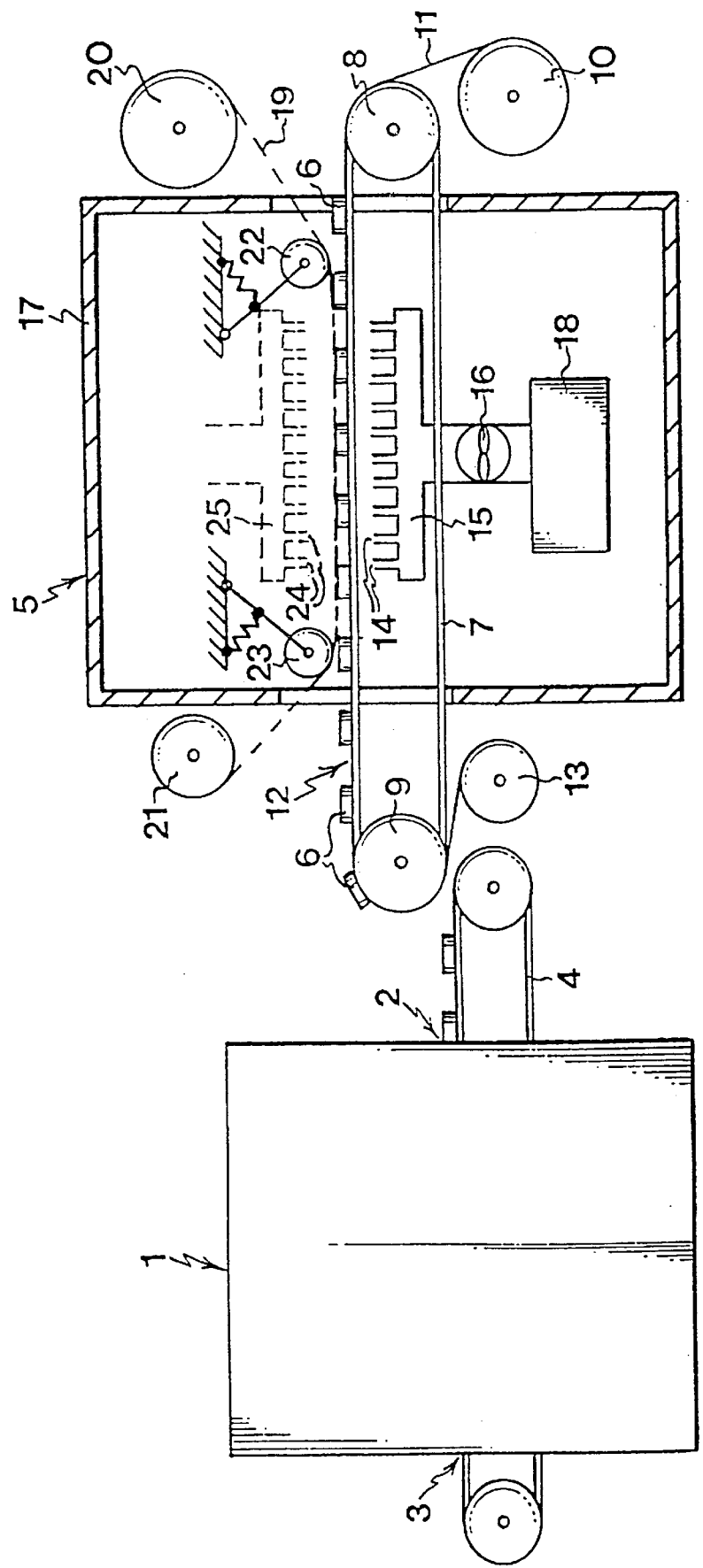

METHOD AND APPARATUS FOR SURFACE FREEZING

This application is a continuation of PCT/SE98/00735 filed Apr. 24, 1998.

BACKGROUND OF THE INVENTION

1. Technical Field of the Invention

The present invention relates to a method and an apparatus for freezing a surface layer of a food product.

2. Prior Art

When freezing products that do not have a fully solid structure, the products can easily mould to the base, on which they are frozen. This is disadvantageous if the base has a shape that differs from the one that is desirable for the product in its final frozen form. There is also a risk that the products freeze onto the base, which results on the one hand in the product being defective and, on the other hand, in residues of the product remaining on the base and needing to be removed before the base can be used again.

It is known that freezing fast can be avoided if the base is given a very low temperature. This is, however, a relatively energy-consuming method as it requires liquid nitrogen or the like. Alternatively, a foil can be used between the base and the product, in which case the product need not have such a low temperature. However, the heat transmission will then be relatively poor especially if the product is not so soft that a major part of its lower surface presses the foil into direct contact with the base.

OBJECT AND SUMMARY OF THE INVENTION

The object of the present invention is to provide a method of freezing a surface layer of a food product in an energy-effective manner and while ensuring that the surface layer over the major part of the lower surface of the product is frozen.

According to the invention, this object is achieved by the method and the apparatus being given the distinguishing features, respectively.

In the inventive method, the food product is thus placed on a non-foraminous conveyor belt and cold air in the form of jets is blown towards the underside of the conveyor belt. This results in very efficient cooling of the non-foraminous conveyor belt from the underside thereof, thereby achieving rapid freezing of a layer closest to the lower surface of the product, said lower surface abutting directly against the upper side of the non-foraminous conveyor belt.

To freeze food products by subjecting them directly to cold jets is previously known, but many products of a wholly or partly looser consistency can, of course, probably not be subjected to such jets. By using a non-foraminous conveyor belt, it will however be possible to freeze also such food products at least over a surface in direct contact with the conveyor belt if the jets are instead directed to the underside of the conveyor belt and this is not made too thick or too poorly thermally conductive.

In a preferred embodiment, the non-foraminous conveyor belt comprises a non-foraminous foil strip supported by a foraminous supporting belt. When the cold jets are blown towards the underside of the this conveyor belt, they pass through the foraminous supporting belt and press the foil strip into intimate contact with a major part of the underside of the food product, even if this surface is somewhat uneven. Excellent heat transmission is thus achieved, and the bottom layer of the food product can rapidly be transferred to a frozen state.

In an alternative embodiment, the conveyor belt comprises a single belt of metal or some other material having good thermal conductivity, such that also in this case excellent heat transmission can be achieved and the bottom layer of the food product thus can be quickly transferred to a frozen state.

Preferably, the cold air is blown in the form of jets towards the underside of the non-foraminous conveyor belt in a stationary area, which extends over the width of the non-foraminous conveyor belt, while at the same time the non-foraminous conveyor belt is successively moved past the stationary area.

In one embodiment, use is also made of a superposed, non-foraminous cover belt, which is positioned on top of and in contact with the food product on the non-foraminous conveyor belt and which is moved in parallel therewith. Also in this case, cold air is blown in the form of jets towards the upper side of the superposed cover belt. As a result, the entire surface layer, or a great part thereof, of the food product can be frozen effectively, i.e. with good heat transmission and in a short time.

An apparatus for carrying out the inventive method comprises a non-foraminous conveyor belt and a plurality of stationary nozzles for blowing cold air in the form of jets towards the underside of the non-foraminous conveyor belt in an area which extends over the width of the non-foraminous conveyor belt.

In a preferred embodiment, the non-foraminous conveyor belt comprises a non-foraminous foil strip supported by a foraminous supporting belt.

Alternatively, the non-foraminous conveyor belt can consist of a single non-foraminous belt of metal or some other material with good thermal conductivity.

In one embodiment, the apparatus also comprises a superposed, non-foraminous cover belt, which is arranged above the non-foraminous conveyor belt to cover a food product positioned on said conveyor belt, and a plurality of additional stationary nozzles for blowing cold air in the form of jets towards the upper side of the superposed, non-foraminous cover belt.

The superposed cover belt preferably is a non-foraminous foil strip, but it can also consist of a belt of metal or some other material with good thermal conductivity.

BRIEF DESCRIPTION OF THE DRAWING

An embodiment of the invention will now be described in more detail with reference to the accompanying drawing which is a schematic side view of a freezing apparatus for food products.

DETAILED DESCRIPTION OF THE PREFERRED EMBODIMENT(S) OF THE INVENTION

More specifically, the drawing illustrates a freezer 1 with a feed opening 2 and a discharge opening 3. The freezer 1 can be of the type using a foraminous conveyor belt 4, which moves the food products that are to be frozen along a helical path from the feed opening 2 to the discharge opening 3 while cold air is forced to flow round the food products, such that they are completely frozen when reaching the discharge opening 3 of the freezer 1.

An apparatus 5 according to the invention is in this case used as a prefreezer for producing at least a frozen bottom layer on food products 6 before they are placed on the foraminous conveyor belt 4 of the freezer 1.

The apparatus 5 comprises a foraminous supporting belt 7 which travels in an endless path over two deflecting rollers 8 and 9. A storage roll 10 contains a foil strip 11, which from the storage roll 10 is extended over an upper run 12 for the supporting belt 7 to a receiving roll 13.

Under the supporting belt 7 in the upper run 12 thereof, a plurality of stationary nozzles 14 are arranged. The nozzles 14 are distributed in an area which extends over essentially the entire width of the supporting belt 7, said width being essentially the same as or greater than the width of the foil strip 11. The nozzles 14 constitute outlets from a duct 15 which in turn is supplied with cold air at high pressure by means of a fan 16, such that the nozzles 14 eject jets, i.e. streams of air at such a speed that the layer of air closest to the foil strip 11 is broken, which considerably improves the heat transmission.

The entire apparatus is accommodated in an insulated casing 17, which also contains a cooling battery 18, to which the suction side of the fan 16 is connected.

As indicated by dashed lines in the drawing, a second foil strip 19 can be passed essentially parallel with the supporting belt 7 and the foil strip 11 from a storage roll 20 to a receiving roll 21. By means of resiliently suspended deflecting rollers 22 and 23, the second foil strip 19 can be made to follow a path which connects to the top faces of the food products 6 conveyed on the foil strip 11 and the supporting belt 7 along the upper run 12.

The foil strip 19 is also pressed down towards the top face of the food products 6 by means of jets of cold air, which are directed by the nozzles 24 towards the upper side of the second foil strip 19. Like the nozzles 14, nozzles 24 constitute outlets from a duct 25, which can be connected to the outlet side of the fan 16 or to the outlet side of a correspondingly arranged fan, such that the jets of cold air from the nozzles 24 press the second foil strip 19 into good contact with at least an essential part of the top faces of the products 6 and, thus, rapidly freeze the surface layer closest to the foil strip 19.

In the above embodiment of the apparatus according to the invention, the supporting belt 7 and the foil strip 11 constitute a non-foraminous conveyor belt, which supports the food products 6 and towards the underside of which in the upper run 12 the jets of cold air are blown from the nozzles 14. In an alternative embodiment, a non-foraminous belt of metal or some other material could replace the belt 7 and the strip 11 and on its own constitute the non-foraminous conveyor belt.

In the above embodiment of the inventive apparatus, the foil strip 19 forms in the same manner a non-foraminous cover belt, which in an alternative embodiment could be a belt of metal or some other material having good thermal conductivity.

What is claimed is:

1. An apparatus for freezing a surface layer of a food product (6), comprising a first non-foraminous conveyor belt (7, 11), a plurality of stationary nozzles (14) and cooling means communicating with said stationary nozzles for producing cold air to be ejected through said stationary nozzles in jets directed towards an underside of the first non-foraminous conveyor belt over an area which extends a width of the first non-foraminous conveyor belt.

2. An apparatus as claimed in claim 1, wherein the first non-foraminous conveyor belt (7, 11) comprises a non-foraminous foil strip (11) supported by a foraminous supporting belt (7).

3. An apparatus as claimed in claim 1, wherein the first non-foraminous conveyor belt is a single non-foraminous belt of material having good thermal conductivity.

4. An apparatus as claim in claim 3, wherein the single non-foraminous belt is metal.

5. An apparatus as claimed in claim 1, further comprising a superposed, second non-foraminous conveyor belt (19), which is arranged above the first non-foraminous conveyor belt (7, 11) to cover a food product (6) positioned on said non-foraminous first conveyor belt, and plurality of additional stationary nozzles (24) for blowing cold air from said cooling means as jets towards an upper side of the superposed, second non-foraminous conveyor belt.

6. An apparatus as claimed in claim 5, wherein the superposed, second non-foraminous conveyor belt (19) is a non-foraminous foil strip.

7. An apparatus as claimed in claim 5, wherein the superposed, second non-foraminous conveyor belt is a belt material having good thermal conductivity.

8. An apparatus as claimed in claim 7 wherein the superposed, second non-foraminous conveyor belt is metal.

9. An apparatus as claim in claim 1, wherein said apparatus constitutes a prefreezer (5) for a freezer (1) for complete freezing of the food product (6).

10. A method of freezing a surface layer of a food product (6) using the apparatus according to claim 1, the method comprising the steps of:

placing the food product (6) on the first non-foraminous conveyor belt (7, 11), and said directing jets towards the underside of the first non-foraminous conveyor belt.

11. An apparatus as claimed in claim 10, wherein the second superposed, non-foraminous conveyor belt is metal.

12. A method as claimed in claim 10, comprising the steps of:

blowing said jets towards an underside of the first non-foraminous conveyor belt (7, 11) from a stationary area extending over a width of the first non-foraminous conveyor belt, and successively moving the first non-foraminous conveyor belt past the stationary area.

13. A method as claimed in claim 10, further comprising the steps of:

positioning and moving a superimposed, second non-foraminous conveyor belt (19), above the first non-foraminous conveyor belt (7, 11), in parallel therewith, and blowing said jets towards an upper side of the superposed, second non-foraminous conveyor belt.

14. An apparatus located in a prefreezer (5) for freezing a surface layer of a food product (6) to be moved to a freezer (1), said apparatus comprising:

a first non-foraminous conveyor belt (7, 11) rotatable in said prefreezer (5);

a plurality of stationary nozzles (14) positioned below a top run of said first non-foraminous conveyor belt; and cooling means communicating with said plurality of nozzles for producing cold air to be ejected through said plurality of nozzles in jets, said jets directed towards an underside of the first non-foraminous conveyor belt over an area which extends a width of the non-foraminous conveyor belt.

15. An apparatus as claimed in claim 14, wherein the first non-foraminous conveyor belt (7, 11) comprises a non-foraminous foil strip (11) supported by a foraminous supporting belt (7).

16. An apparatus as claimed in claim 14, wherein the first non-foraminous conveyor belt is a single non-foraminous belt of material having good thermal conductivity.

17. An apparatus as claimed in claim 14, further comprising a superposed, second non-foraminous conveyor belt (19), which is arranged above the first non-foraminous conveyor belt (7, 11) to cover a food product (6) positioned on said first conveyor belt, and a plurality of additional stationary nozzles (24) for blowing cold air from said cooling mean as jets towards an upperside of the superposed, non-foraminous conveyor belt.

18. An apparatus as claimed in claim 17, wherein the second superposed, non-foraminous conveyor belt (19) is a non-foraminous foil strip.

19. An apparatus as claimed in claim 17, wherein the second superposed, non-foraminous conveyor belt is a belt material having good thermal conductivity.

20. An apparatus as claim in claim 19, wherein the single non-foraminous belt is metal.

* * * * *